US010375354B2

(12) United States Patent
Sathya et al.

(10) Patent No.: US 10,375,354 B2
(45) Date of Patent: Aug. 6, 2019

(54) VIDEO COMMUNICATION USING SUBTRACTIVE FILTERING

(71) Applicant: Facebook, Inc., Menlo Park, CA (US)

(72) Inventors: Sai Sri Sathya, Tamil Nadu (IN); Pritesh Sankhe, Maharashtra (IN); Myshkin Ingawale, Maharashtra (IN)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/863,713

(22) Filed: Jan. 5, 2018

(65) Prior Publication Data

US 2019/0215482 A1    Jul. 11, 2019

(51) Int. Cl.
  *H04N 7/14*    (2006.01)
  *H04N 7/15*    (2006.01)
  *G06K 9/00*    (2006.01)
  *H04L 29/06*   (2006.01)
  *G06T 5/50*    (2006.01)

(52) U.S. Cl.
  CPC ......... *H04N 7/147* (2013.01); *G06K 9/00315* (2013.01); *G06T 5/50* (2013.01); *H04L 65/1069* (2013.01); *H04L 65/80* (2013.01); *H04N 7/15* (2013.01); *G06T 2207/10016* (2013.01); *G06T 2207/20224* (2013.01); *G06T 2207/30201* (2013.01)

(58) Field of Classification Search
  CPC .................. G06K 9/00315; G06T 5/50; G06T 2207/10016; G06T 2207/20224; G06T 2207/30201; H04L 65/80; H04L 65/1069; H04N 7/15; H04N 7/147

USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| 5,617,135 A | * | 4/1997 | Noda | ...................... H04N 7/147 |
| | | | | 348/14.12 |
| 5,859,921 A | * | 1/1999 | Suzuki | ............... G06K 9/00268 |
| | | | | 382/118 |
| 6,081,505 A | * | 6/2000 | Kilkki | ................. H04L 47/6215 |
| | | | | 370/230 |
| 7,162,073 B1 | * | 1/2007 | Akgul | ................ G01N 21/8851 |
| | | | | 348/125 |

(Continued)

*Primary Examiner* — Khai N. Nguyen
(74) *Attorney, Agent, or Firm* — Baker Botts L.L.P.

(57) ABSTRACT

In one embodiment, a method includes receiving a request to establish an audiovisual streaming session between a first device and a second device; determining a level of network connectivity for a network associated with the first device or the second device; receiving data from the first device. The data may the data represent facial expressions of a user in a video captured by the first device. The data may be generated by the first device using the video based on: detections of a face and facial features of the user in the video and application of one or more subtractive filters using the detected face and facial features. The subtractive filters may be selected based on the level of network connectivity. The method may also include sending the data to the second device with instructions to process the data and display a representation of the user's facial expressions.

20 Claims, 5 Drawing Sheets

GOOD CONNECTION: NO FILTERING

MODERATELY POOR CONNECTION: FEATURE EXTRACTION

MODERATELY GOOD CONNECTION: FILTER BACKGROUND

POOR CONNECTION: FACIAL LANDMARK EXTRACTION

(56) References Cited

U.S. PATENT DOCUMENTS

| | | | | |
|---|---|---|---|---|
| 7,684,982 | B2* | 3/2010 | Taneda | G10L 15/25 |
| | | | | 379/392.01 |
| 9,082,018 | B1* | 7/2015 | Laska | G06K 9/00711 |
| 9,158,974 | B1* | 10/2015 | Laska | G06T 7/246 |
| 9,331,915 | B1* | 5/2016 | Brandwine | H04L 43/04 |
| 2002/0101860 | A1* | 8/2002 | Thornton | H04L 12/14 |
| | | | | 370/352 |
| 2006/0224382 | A1* | 10/2006 | Taneda | G10L 15/25 |
| | | | | 704/233 |
| 2008/0133716 | A1* | 6/2008 | Rao | G06Q 30/08 |
| | | | | 709/220 |
| 2011/0072508 | A1* | 3/2011 | Agarwal | H04L 63/0227 |
| | | | | 726/13 |
| 2011/0225610 | A1* | 9/2011 | Prieto | H04N 7/173 |
| | | | | 725/38 |
| 2012/0069131 | A1* | 3/2012 | Abelow | G06Q 10/067 |
| | | | | 348/14.01 |
| 2014/0314310 | A1* | 10/2014 | Movellan | G06K 9/00302 |
| | | | | 382/155 |
| 2016/0071549 | A1* | 3/2016 | von Sneidern | G11B 27/031 |
| | | | | 386/241 |
| 2016/0379042 | A1* | 12/2016 | Bourlai | G06K 9/00288 |
| | | | | 382/118 |
| 2017/0118539 | A1* | 4/2017 | Lokshin | G06K 9/00718 |
| 2017/0256033 | A1* | 9/2017 | Tuzel | G06T 5/00 |
| 2017/0308734 | A1* | 10/2017 | Chalom | G06K 9/0061 |
| 2017/0331952 | A1* | 11/2017 | Rogers | H04M 3/42051 |

\* cited by examiner

VIDEO COMMUNICATION USING SUBTRACTIVE FILTERING

TECHNICAL FIELD

This disclosure generally relates to video communication.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a communication network may provide video conferencing capabilities in areas with poor network connectivity. In many parts of the world, poor network connections hinder or prevent video calls. When network connectivity is poor, video calls may be grainy, lag, or completely impossible to discern. The communication network may be the social-networking system or may be any other suitable communication network. The communication network may provide a method for enabling video data to be transmitted with improved user experience. When the communication network receives a request to establish an audio-visual streaming session between a first device and a second device, the communication network may determine a level of network connectivity for a network associated with the first device or the second device (or both devices). This determination may alternatively be performed by the devices. The communication network may then receive data from the first device. The received data may represent facial expressions of a user in a video captured by the first device. The received data may not necessarily be a video stream. Instead, the received data may be generated using a video of the user based on (1) detections of a face and facial features of the user in the video; and (2) application of one or more subtractive filters using the face and facial features. In particular embodiments the subtractive filters may be understood to be a software program or subroutine that is applied to a video or other data set and that produces a reduced data set. The subtractive filters may be selected based on the level of network connectivity. In particular embodiments, the received data may be sent to the client device of the second user for display. In particular embodiments, the data sent to the client device may be reconstructed either at the communication network or at the client device of the second user. The reconstruction of the data may be for the purpose of displaying a video stream that approximates the first user's appearance, expressions, and mannerisms. As an example of the above-described process and not by way of limitation, two users may wish to start a video call. The communication network may receive a request to initiate the call from the first user. The communication network may determine a level of network connectivity at the client device of the first user or the second user (or both). The network connection may be poor (e.g., a 3G network with a download/upload speed of 128 kbps). Although a poor network connection may in theory be able to support a video call, the video call may be choppy, pixelated, and have interruptions due to a poor connection. Based on the network connection, the data that the communication network receives may be reduced by a subtractive filter applied at the client device of the first user. This way, less data needs to be transmitted to the communication network over the poor network connection. The subtractive filter that is applied may be based on the network connection. Since this example network connection is poor, the data may be filtered by a "facial-landmark" filter, which will be discussed below. This reduced data set may be sent to the communication network. The communication network may send this data as is to the second client device, or the communication network may process this data to generate a representation of the first user's facial expressions.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
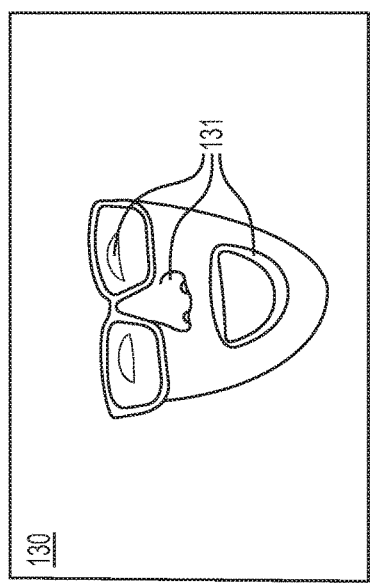
FIG. 1 illustrates example subtractive filters that may be applied to a data set.
Figure 1:
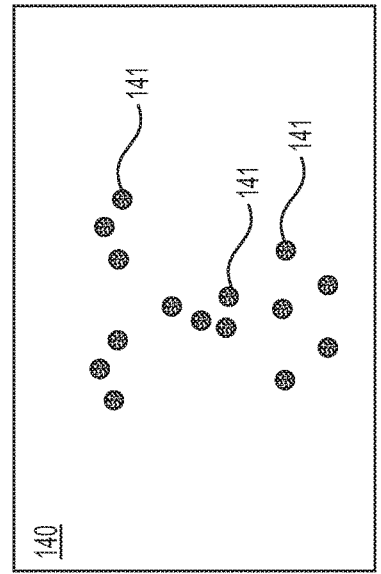
Figure 1:
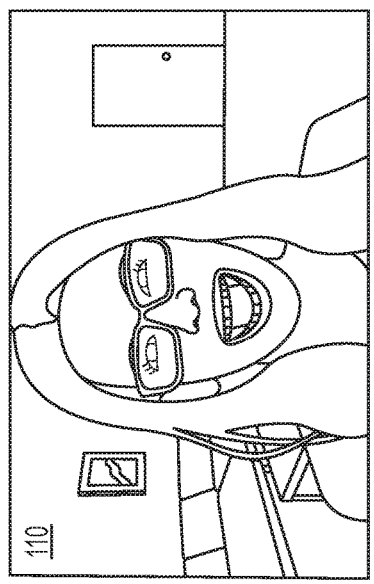
Figure 1:
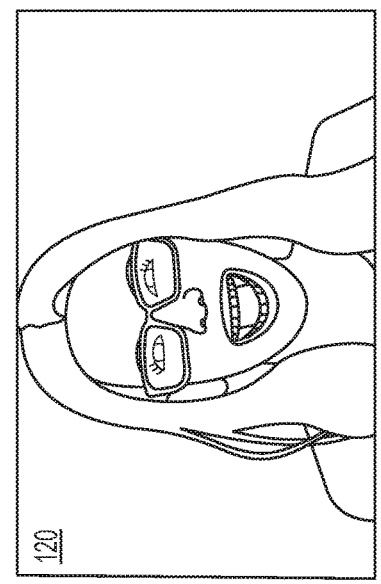

In particular embodiments, a communication network may provide video conferencing capabilities in areas with poor network connectivity. In many parts of the world, poor network connections hinder or prevent video calls. When network connectivity is poor, video calls are grainy and often lag or are completely impossible. The communication network may be the social-networking system or may be any other suitable communication network. The communication network may provide a method for enabling video data to be transmitted with improved quality. When the communication network receives a request to establish an audiovisual streaming session between a first device and a second device, the communication network may determine a level of network connectivity for a network associated with the first device or the second device (or both devices). The communication network may then receive data from the first device. The received data may represent facial expressions of a user in a video captured by the first device. The received data may not necessarily be a video stream. Instead, the received data may be generated using a video of the user based on (1) detections of a face and facial features of the user in the video; and (2) application of one or more subtractive filters using the face and facial features. In particular embodiments the subtractive filters may be understood to be a software program or subroutine that is applied to a video or other data set and that produces a reduced data set. The subtractive filters may be selected based on the level of network connectivity. In particular embodiments, the received data may be sent to the client device of the second user for display. In particular embodiments, the data sent to the client device may be reconstructed either at the communication network or at the client device of the second user. The reconstruction of the data may be for the purpose of displaying a video stream that approximates the first user's appearance and mannerisms.

As an example of the above-described process and not by way of limitation, two users may wish to start a video call. The communication network may receive a request to initiate the call from the first user. The communication network may determine a level of network connectivity at the client device of the first user or the second user (or both). The network connection may be poor (e.g., a 3G network with a download/upload speed of 128 kbps). Although a poor network connection may in theory be able to support a video call, the video call may be choppy, pixelated, and have interruptions due to a poor connection. Based on the network connection, the data that the communication network receives may be reduced by a subtractive filter applied at the client device of the first user. This way, less data needs to be transmitted to the communication network over the poor network connection. The subtractive filter that is applied may be based on the network connection. Since this example network connection is poor, the data may be filtered by a "facial-landmark" filter, which will be discussed below. This reduced data set may be sent to the communication network. The communication network may send this data as is to the second client device, or the communication network may process this data to generate a representation of the first user's facial expressions.

FIG. 1 illustrates four example representations of a user in an audiovisual communication stream. Three of the representations have been filtered and processed: 120, 130, and 140. Representation 110 may be an unfiltered and substantially unprocessed video stream. Representation 110 may be the video representation when both the first device and the second device have a good connection and no filter was applied. Representation 120 may be the representation generated when there was a moderately good connection and a "face filter" was applied. As an alternative to representation 120 (e.g., filtering out the background elements in video data), the video representation may be cropped if the connection level falls within a particular window. As an example and not by way of limitation, if the connection is moderately good, the video may be cropped from an original size of e.g., 1280×720 pixels to e.g., 130×70 pixels. The cropped video may only contain the user's head. Representation 130 may be the representation generated when there was a moderately poor connection and a "dominant-feature filter" was applied. Representation 130 may display one or more dominant features 131 such as eyes, nose, and the mouth of the user. Representation 140 may be the representation generated when there was a poor connection and a "facial-landmarks filter" was applied. Representation 140 may display one or more facial landmarks 141 that correspond to various parts of the user's face (e.g., a facial landmark 141 may correspond to the left corner of the user's mouth, another facial landmark 141 may correspond to part of the user's right eye). Each of these filters will be discussed herein. Although this disclosure describes generating particular representations in a particular manner, this disclosure contemplates generating any suitable representations in any suitable manner.

In particular embodiments, the communication network may receive a request to establish a live audiovisual streaming session between a first device associated with a first user and a second device associated with a second user. An audiovisual streaming session may be a period of time in which two for more devices exchange audio and video data. As an example and not by way of limitation, a video call in which a first user and a second user can see and talk to each other in real time may be a live audiovisual streaming session. In particular embodiments, the communication network may receive a request for audiovisual information. Such a request may not be in the context of a video call, but may instead be in the context of streaming live or pre-recorded video from a server on a client device. As an example and not by way of limitation, the communication may receive a request to receive a recording of a television show, a YOUTUBE video, a FACEBOOK video, an NBA basketball game, or any other suitable video content. Thus, in particular embodiments, this disclosure may apply to more than video calls—it may apply to any form of video content streaming over a network. Although this disclosure describes receiving a request in a particular manner, this disclosure contemplates receiving a request in any suitable manner.

In particular embodiments, the communication network may determine a level of network connectivity for a network associated with the first device or the second device. The network may be a cellular or data network such as AT&T, VERIZON, T-MOBILE, or may be a WiFi network, or may be any other suitable network. The communication network may use any suitable method to determine the level of network connectivity, including determining a time duration of a handshake to initiate communication between the communication network and the first device, estimating bandwidth (e.g., 128 kbps), estimating signal strength (e.g., −100 dB), or any other suitable method. In particular embodiments, there may be any number of levels of connectivity. For the sake of simplicity, this disclosure will discuss four levels of connectivity, although this disclosure contemplates any suitable number of levels of connectivity. In particular embodiments, four levels of connectivity may include poor, moderately poor, moderately good, and good. One way the communication network may determine the level of network connectivity may be by determining whether a measured characteristic (e.g., bandwidth, signal strength, time duration for handshake) falls within a particular window of measurement. As an example and not by way of limitation, the measured characteristic may be bandwidth. Poor connectivity support relatively low bandwidth (e.g., 25% or less of maximum bandwidth on the particular network associated with the first device, second device, or a third network to be used as a model network, which may be the network associated with the communication network). As an example and not by way of limitation, a poor connection may only support a download or upload speed of 50 kbps. Moderately poor connections may support somewhat higher bandwidth levels (e.g., 50% of maximum bandwidth). As an example and not by way of limitation, a moderately poor connection may support a download or upload speed of 128 kbps. Moderately good connections may support somewhat higher bandwidth levels than moderately poor connections (e.g., 75% of maximum bandwidth). As an example and not by way of limitation, a moderately good connection may support a download or upload speed of 400 kbps. Good connections may support higher bandwidth levels than moderately good connections (e.g., 90-100% of maximum bandwidth). As an example and not by way of limitation, a good connection may support a download or upload speed of 1.5 Mbps. Although this disclosure describes determining particular network connectivity levels in a particular manner, this disclosure contemplates determining any suitable network connectivity levels in any suitable manner. The following table summarizes the four connectivity levels discussed above along with example ranges of bandwidths and download/upload speeds:

TABLE 1

Example Network Connectivity Levels

| | Level of Connectivity | Bandwidth (as a % of max. bandwidth) | Bandwidth (as upload/download speed) |
|---|---|---|---|
| A | Poor | 0-25% | 0-50 kbps |
| B | Moderately Poor | 26-50% | 51-150 kbps |
| C | Moderately Good | 51-75% | 151-999 kbps |
| D | Good | 76-100% | 1 Mbps and over |

Figure 2:
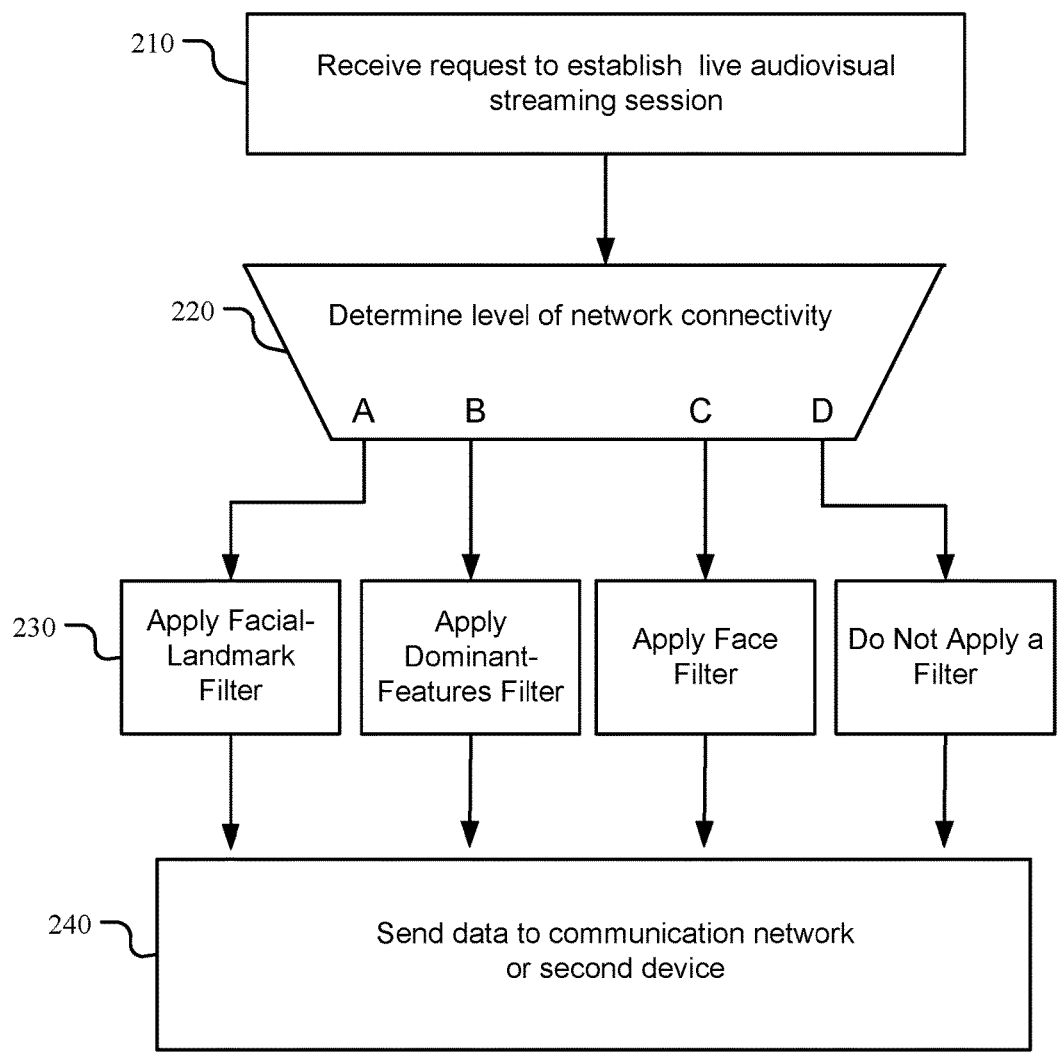
FIG. 2 illustrates an example flow for determining to apply one or more example filters to video data.

FIG. 2 illustrates an example flow for determining to apply one or more example filters to video data. At step 210, the communication system may receive (e.g., via a server operated by the communication system) a request to establish a live audiovisual streaming session. In particular embodiments, the methods discussed in this disclosure may be decentralized; that is, the request may be sent from the first device directly to the second device. At step 220, the communication system via a server (or the first or second client device, if operating in a decentralized system) may determine a level of network connectivity between the first device and the communication network. In the example of FIG. 2, there may be four levels of network connectivity and four filter options, each corresponding to a connection level. The four levels of connectivity may correspond to those listed in Table 1. In particular embodiments, at step 230, the first device may apply a particular filter based on the connection level. If connectivity is good, then no filter may be applied. At step 240, the first device may send data to the communication network (or to the second device, if operating in a decentralized system). The data may be video data (e.g., in the case of the face filter or no filter, the filtered data may still be video data), or may be some other type of data. As an example and not by way of limitation, the data that is produced after the facial-landmark filter is applied may be points with x, y, z, and time coordinates. Although this disclosure describes determining to apply one or more filters in a particular manner, this disclosure contemplates determining to apply one or more filters in any suitable manner.

In particular embodiments, the communication network may determine the level of network connectivity by any suitable methods. Such methods may include the time it takes to establish a wireless connection between the client device and the communication network, the time it takes for a client device to handshake with another device (e.g., a device associated with the communication system), or any other suitable method. As an example and not by way of limitation, the client device may send a message (e.g., the request to initiate the audiovisual streaming session), and the message may have a timestamp associated with it. The timestamp may indicate the time that the message was sent by the client device (this may be referred to as a sent timestamp). The communication network may calculate the difference in time between the sent timestamp and the time that a wireless connection is established. Alternatively, the communication system may send a response message back to the client device (e.g., an ACK signal) that also has a timestamp associated with it. The client device may calculate the time difference between the sent timestamp and the received timestamp. Different subtractive filters may be applied based on how long it took to establish the wireless connection or conduct the handshake. Another method to determine the level of network connectivity may be by using historical network connectivity for a particular geographic region. Another method may be to use the network provider or a third party system to provide information associated with the network connectivity. Another method to determine the level of network connectivity may be to determine a time duration to download or upload a piece of content. As an example and not by way of limitation, the first device may send a packet of content to the communication network and the communication network or the first device may determine how long it took for the packet to be uploaded to the communication network. One or more subtractive filters may be applied based on the time duration, as will be discussed herein. Another method to determine the level of network connectivity may be to identify which mobile communications standard the client device is currently using to access the Internet (e.g., 2G, 3G, 4G, LTE, 5G). It may be assumed that the older the communications standard, the poorer the connection. Although this disclosure describes determining a level of network connectivity in a particular manner, this disclosure contemplates determining a level of network connectivity in any suitable manner.

In particular embodiments, the communication network may receive data from the first device. The data may represent facial expressions of a user in a video captured by the first device. In particular embodiments, the data may have been generated by the first device using the video based on (1) detections of a face and facial features of the user in the video; and (2) application of one or more subtractive filters using the detected face and facial features. The one or more subtractive filters may have been selected based on the level of network connectivity. In particular embodiments, the detections of the face and facial features may be done by Haar Cascading. Haar Cascading may be used to identify the major features of the user's face. Haar Cascading is a machine-learning based approach where a cascade function is trained from a large number of positive images (e.g., images with faces) and negative images (images without faces). It is then used to detect faces and facial features in other images. Although this disclosure describes detecting a face and facial features in a particular manner, this disclosure contemplates detecting a face and facial features in any suitable manner.

In particular embodiments, if the network connection is poor (e.g., below a threshold level), the subtractive filter applied may be a "facial-landmark" filter. The facial-landmark filter may remove substantially all video data from the original data stream except for a set of facial landmarks for each face in the video. The facial landmarks may be a set of coordinate points for a two-dimensional plane or a three-dimensional area. In particular embodiments, the coordinate points may be generated based on the output of a facial recognition algorithm. The coordinate points may be used to represent 3D facial features associated with the user. Each point may correspond to a particular location on an identified face in the video. As an example and not by way of limitation, a first point may correspond to the left corner of the user's mouth, a second point may correspond to the middle of the upper lip, a third point may correspond to the middle of the lower lip, and a fourth point may correspond to the right corner of the user's mouth. Although this disclosure describes receiving data from a first device in a particular manner, this disclosure contemplates receiving data from a first device in any suitable manner.

In particular embodiments, if the network connection is moderately poor, a "dominant-feature" filter may be applied to the video captured by the first device. A dominant-feature filter may use Haar Cascading or a similar facial recognition technique to identify one or more dominant elements in a video stream (e.g., dominant elements on a person's face, such as the eyes, nose, and mouth) and subtract out substantially everything else from the video stream to generate an output data set that contains only the dominant features. Dominant features in this context may be major facial elements such as the eyes and mouth of the user. As an example and not by way of limitation, the first device may have a moderately poor connection, so a dominant-feature filter may be applied to a video captured by the first device. The dominant-feature filter may filter out substantially all data except for the dominant facial features of the user. In particular embodiments, the remaining data after the dominant feature filter is applied may be images of the dominant facial features (e.g., eyes and mouth of the user). Alternatively, the remaining data after the dominant feature filter is applied may be lines associated with the user's features. In particular embodiments, the lines may be generated based on the output of a facial recognition algorithm. The lines may represent the user's face and may be associated with particular locations on a two- or three-dimensional graph. The resulting image may resemble a line drawing of the user's face. This representation may approximate the user but may be more simplified because it contains less data than a realistic video of the user. Although this disclosure describes receiving data from a first device in a particular manner, this disclosure contemplates receiving data from a first device in any suitable manner.

In particular embodiments, if the network connection is moderately good, a "face" filter may be applied to the video captured by the first device. A face filter may also use Haar Cascading or a similar facial recognition technique to identify one or more faces in a video stream and subtract out substantially everything else from the video stream to generate an output data set that contains only the identified faces. Thus, the face filter may filter out noisy backgrounds that may require a large amount of data to transmit but may be irrelevant to the video chat. As an example and not by way of limitation, the first device may have a moderately good connection, so a face filter may be applied to a video captured by the first device. The face filter may filter out substantially all data except for the face of the user or faces of the users that are in the video captured by the first device. The resulting data may be a video of the user's face without the background. As an alternative to filtering out the background, the first device may crop the video if the connection level falls within a particular window. The first device may detect one or more faces in the video and may crop the video such that only the faces are sent to the communication network (or to the second device). As an example and not by way of limitation, if the connection is moderately good, the video may be cropped from an original size of 1280×720 pixels to 130×70 pixels. Although this disclosure describes altering video data in a particular manner, this disclosure contemplates altering video data in any suitable manner.

In particular embodiments, the communication network may send the data to the second device with instructions to process the data and display a representation of the user's facial expressions on a display screen associated with the second device. In particular embodiments, and especially if a more subtractive filter is used on the video captured by the first device (e.g., facial-landmarks filter or dominant-features filter), it may be desirable to "reconstruct" the video using the data sent by the first device to the communication network. In particular embodiments, reconstruction is not a literal reconstruction of the original video captured by the first device. Instead, the representation may comprise one or more animated features that have been added to the data. As an example and not by way of representation, if a facial-landmark filter was applied to a video, the data sent by the first device may be a set of coordinate points (e.g., facial landmarks) that have x, y, z, and t (time) coordinates. One or more animations may be added to this data. Examples of animations include lines connecting the facial landmarks to make a more defined-looking face, a cartoonish avatar that at least somewhat resembles the user. In the case of the avatar, the facial landmarks may be the underlying data, and the avatar may be "fit" onto the facial landmarks. The avatar may have its own set of facial landmarks that correspond to the facial landmarks in the data. As an example and not by way of limitation, the avatar may have a facial landmark corresponding to the left corner of the avatar's mouth. This facial landmark of the avatar may also correspond to a facial landmark of the user that corresponds to the left corner of the user's mouth. That way, when the user smiles, the left corner of her mouth may raise. The corresponding facial landmark on the avatar may also raise to approximate the facial expressions of the user. In particular embodiments, the representation may approximate the user's facial expressions during the video chat. In particular embodiments, the representation may be life-like and appear as if no filtering took place at all. In particular embodiments, the representation may be minimal in order to reduce lag as much as possible. As an example and not by way of limitation, the data sent by the first device to the communication network may be a set of facial landmarks (e.g., points in a coordinate system). The representation may simply be lines that connect the points, so the first user appears as an arrangement of points that are connected by lines. In particular embodiments, the representation may be an avatar that appears cartoonish or otherwise animated. As an example and not by way of limitation, the communication network or the second device (depending on where the processing is being performed) may apply an animation algorithm to the data to generate an animation that approximates the first user but otherwise appears to be an animation. Although this disclosure describes generating a representation of a user in a particular manner, this disclosure contemplates generating a representation of a user in any suitable manner.

In particular embodiments, the processing may take place either at the second device (e.g., the receiver's device) or at the communication system. Where the processing takes place may depend at least in part on a connectivity level between the communication network and the second device. If the connectivity level is above a threshold level (e.g., good or moderately good), the communication network may perform the processing. If the connectivity level is below a threshold level (e.g., poor or moderately poor), the second device may perform the processing. As an example and not by way of limitation, the first device may have a poor connection because it is located in an area with poor connectivity (e.g., a developing country, or a rural area in a developed country), so it may send data to the communication system that has been filtered by a facial-landmarks filter. The second device may have a good connection (e.g., it may be connected to WiFi, or may be in an area with LTE services). In this scenario, the communication network may process the received data and generate the representation in real-time. It may then send the representation to the second device as a video stream. This may be possible because of the good connection between the second device and the communication network. If the second device has a connection level below a threshold level, the communication network may send the data to the second device for processing. Although this disclosure describes processing data in a particular manner, this disclosure contemplates processing data in any suitable manner.

In particular embodiments, the representation may be generated by a machine-learning model. The machine-learning model may take as input (1) the data sent by the first device, and optionally (2) one or more other features associated with the audiovisual streaming session. In particular embodiments, the data sent by the first device may include the filtered video data (which may be a set of coordinate points that change over time) and audio data. In particular embodiments, the machine-learning model may take the filtered video data and generate the representation based on the filtered video data and the audio data. As an example and not by way of limitation, the machine-learning model may generate a representation where the user tilts his head back and smiles when the audio data indicates that the user is laughing. In particular embodiments, the one or more other features associated with the audiovisual streaming session may include the other participants in the audiovisual streaming session, the time of day, the volume of the audio data, the tone of the audio data (e.g., whether the audio data indicates short, staccato-like sounds or longer, more melodious sounds), or any other suitable input. As an example and not by way of limitation, if the audio data indicates a high volume and short, staccato-like sounds, these may be signals that the user is yelling and is angry. The machine-learning model may then generate a representation that portrays the user as being angry or as yelling, or both. Although this disclosure describes generating a representation of a user in a particular manner, this disclosure contemplates generating a representation of a user in any suitable manner.

In particular embodiments, the machine-learning model may be trained to map a set of received facial-feature data points to actual images or short video clips of the user displaying the corresponding expressions. In particular embodiments, the training data may be aggregate user data (e.g., user data from a plurality of users of the communication system), or the training data may be from the user or users who are participating in the audiovisual streaming session. The training data may be of the form of photos and videos of the user (or multiple users if the training data is aggregate user data). In particular embodiments, the training data may be a brief video of the user at the beginning of or immediately prior to the audiovisual streaming session. As an example and not by way of limitation, the first user may send the request to begin the audiovisual streaming session with a second user. Both users may be prompted on their client devices to record a short (e.g., 5-15 seconds) video of them speaking or performing other functions, such as smiling, frowning, furrowing their brow, etc. This video, which may be processed using the aforementioned facial-recognition algorithms to obtain facial-feature data points, may be used as training data for the machine-learning model. In particular embodiments, the training data may be stored photos and videos of the users. In particular embodiments, a first user's client device may train such a model to map a second user's facial-feature data points to images or clips of the second user. The first user may obtain the training data from the first few seconds of the current audiovisual streaming session, or from previous sessions with the second user. Using such data that is specific to the current conversation parties may be preferable, since a user's expressions, mannerisms, tones, etc. may differ depending on his/her conversation partner. Once trained, the first user's device may store the model for subsequent use. In particular embodiments, the training of the model for mapping the second user's facial-feature data points may be performed on the second user's device. In this case, whenever the second user begins an audiovisual streaming session with another user (e.g., the first user), the second user may first send the trained model to the other user's device so that it can use the model to generate representations of the second user's expressions. In particular embodiments, the communication network may perform the training. The communication network may receive photos and videos of users, which it may store in its database. In accordance with one or more privacy settings designated by the user, the communication network may train the machine-learning model by accessing the user's stored photos and videos and inputting those as the training data. In a similar manner described above, the communication network may train and store the mapping models. When the first or second user initiates an audiovisual streaming session, the communication network may send the model associated with one user (e.g., the second user) to the other user (e.g., the first user). Although this disclosure describes training a machine-learning model in a particular manner, this disclosure contemplates training a machine-learning model in any suitable manner.

Figure 3:
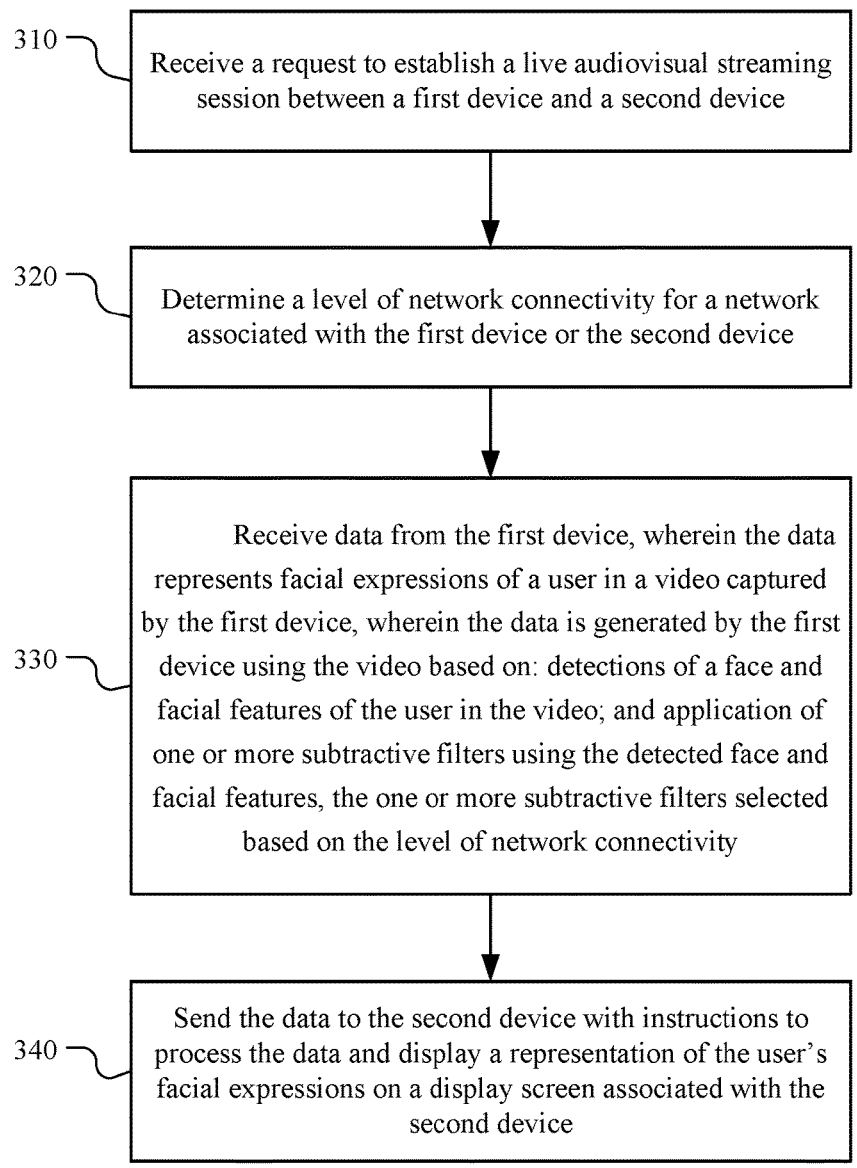
FIG. 3 illustrates an example method for sending filtered data over a wireless connection.

FIG. 3 illustrates an example method 300 for sending filtered data over a wireless connection. The method may begin at step 310, where the communication system may receive a request to establish a live audiovisual streaming session between a first device and a second device. At step 320, the communication system may determine a level of network connectivity for a network associated with the first device or the second device. At step 330, the communication system may receive data from the first device, wherein the data represents facial expressions of a user in a video captured by the first device, wherein the data is generated by the first device using the video based on: detections of a face and facial features of the user in the video; and application of one or more subtractive filters using the detected face and facial features, the one or more subtractive filters selected based on the level of network connectivity. At step 340, the communication system may send the data to the second device with instructions to process the data and display a representation of the user's facial expressions on a display screen associated with the second device. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for sending filtered data over a wireless connection including the particular steps of the method of FIG. 3, this disclosure contemplates any suitable method for sending filtered data over a wireless connection including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
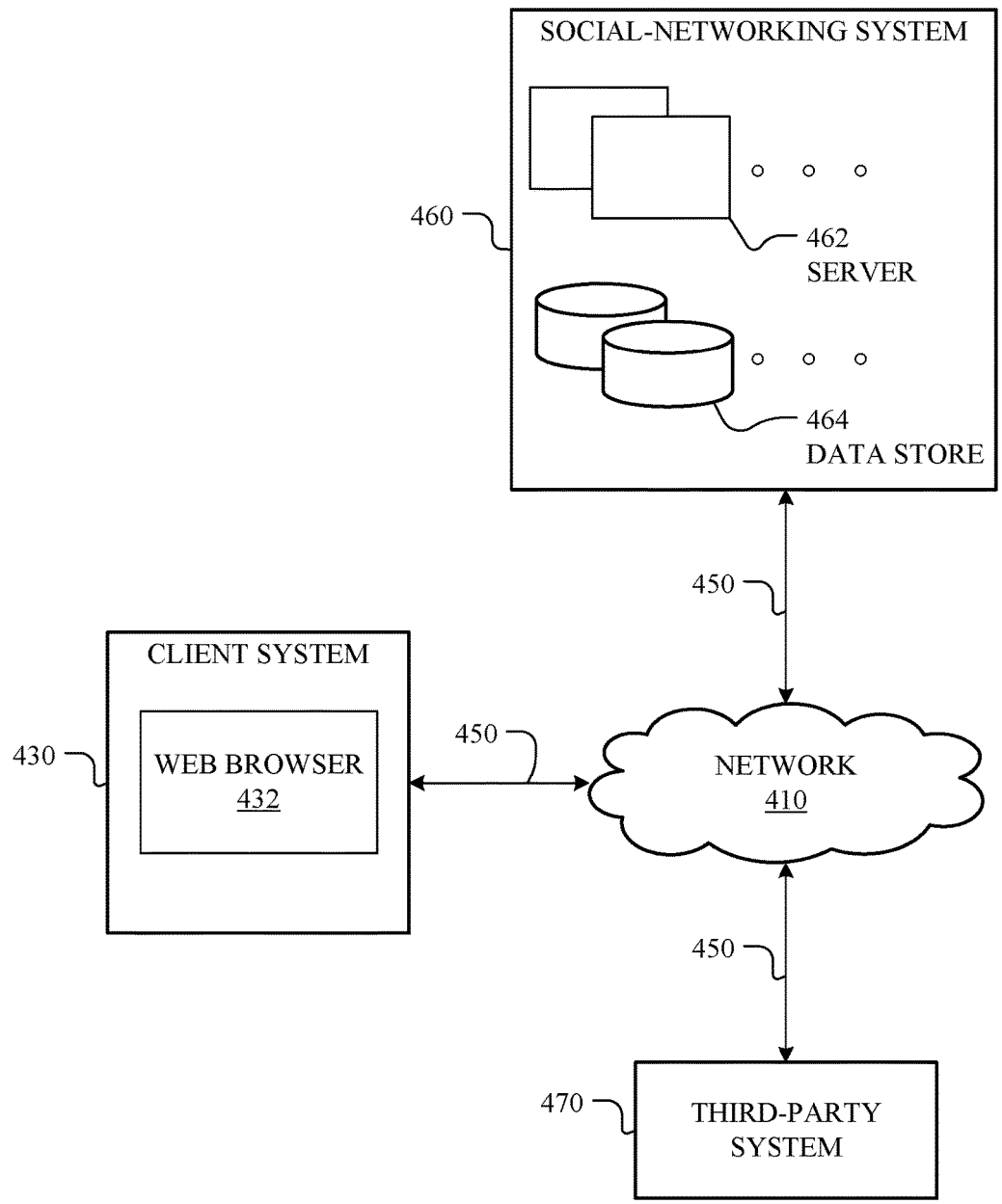
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 460 or shared with other systems (e.g., third-party system 470). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 470, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 464, social-networking system 460 may send a request to the data store 464 for the object. The request may identify the user associated with the request and may only be sent to the user (or a client system 430 of the user) if the authorization server determines that the user is authorized to access the object based on the privacy settings associated with the object. If the requesting user is not authorized to access the object, the authorization server may prevent the requested object from being retrieved from the data store 464, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 5:
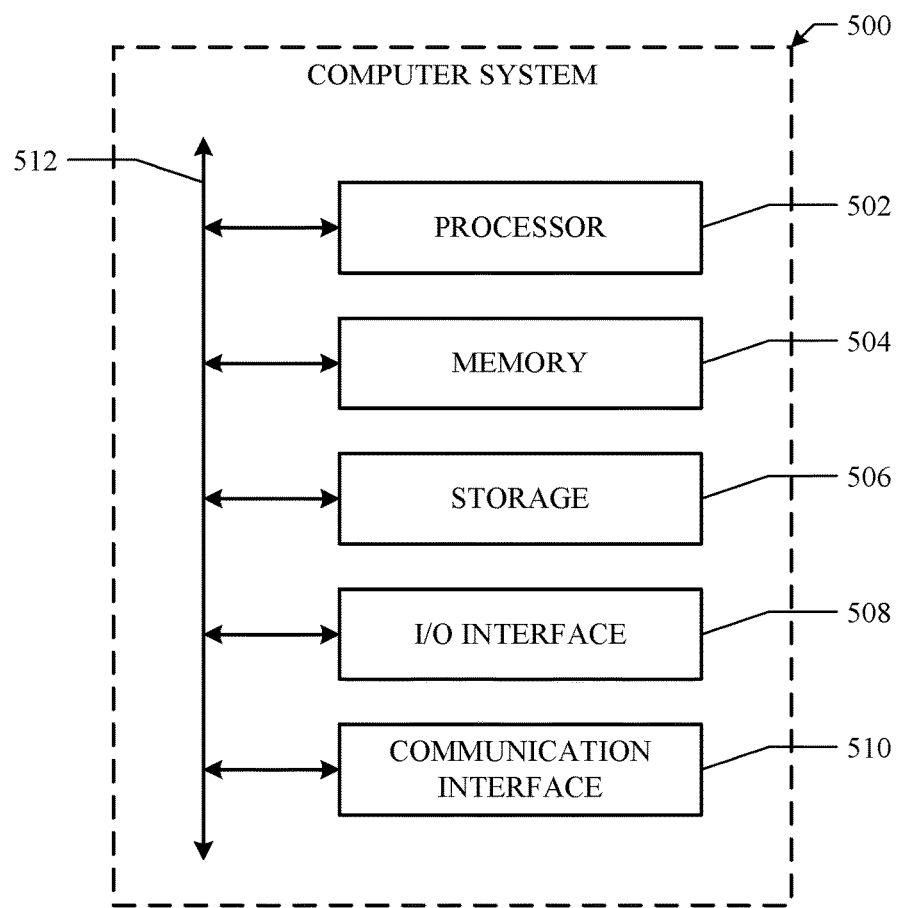
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate.

In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving a request to establish a live audiovisual streaming session between a first device and a second device;
   determining a level of network connectivity for a network associated with the first device or the second device;
   receiving data generated by the first device, wherein the data represents facial expressions of a user in a video captured by the first device, wherein the data is generated by the first device using the video based on:
      a detection of a face or a facial feature of the user in the video; and
      an application of one or more subtractive filters on the video using the detected face or facial feature, wherein the one or more subtractive filters are selected based on the level of network connectivity, wherein the data, relative to the video, is reduced in size based on the application of the one or more subtractive filters; and
   sending the data to the second device with instructions to process the data and display a representation of the user's facial expressions on a display screen associated with the second device.

2. The method of claim 1, wherein one of the subtractive filters is a facial-landmark filter, wherein the facial-landmark filter removes substantially all data from the video except for a set of facial landmarks for the face, and wherein the facial-landmark filter is applied based on a determination that the level of network connectivity is below a threshold level.

3. The method of claim 1, wherein the representation of the user's facial expressions comprises one or more animated features that have been added to the data.

4. The method of claim 1, wherein one of the subtractive filters is a dominant-feature filter, wherein the dominant-feature filter removes substantially all video data from the original data stream except for one or more dominant features of each of the isolated faces, and wherein the dominant-feature filter is applied based on a determination that the level of network connectivity is moderately poor.

5. The method of claim 4, wherein the dominant features comprise eyes and a mouth of the first user.

6. The method of claim 1, wherein the representation of the user's facial expressions comprises one or more animated features that have been added to the data, and wherein the animated features are generated at least in part based on a machine-learning model that takes as input the data received from the first device and audio data and outputs the representation of the user's facial expressions.

7. The method of claim 6, wherein the machine-learning model is trained with an audiovisual recording of the user.

8. The method of claim 6, wherein the machine-learning model is trained with one or more images or audiovisual recordings stored in association with a social-networking system.

9. The method of claim 1, wherein the detection of the face or the facial feature is accomplished using Haar Cascading.

10. One or more computer-readable non-transitory storage media embodying software that is operable when executed to:
    receive a request to establish a live audiovisual streaming session between a first device and a second device;
    determine a level of network connectivity for a network associated with the first device or the second device;
    receive data generated by the first device, wherein the data represents facial expressions of a user in a video captured by the first device, wherein the data is generated by the first device using the video based on:
       a detection of a face or a facial feature of the user in the video; and
       an application of one or more subtractive filters on the video using the detected face or facial feature, wherein the one or more subtractive filters are selected based on the level of network connectivity, wherein the data, relative to the video, is reduced in size based on the application of the one or more subtractive filters; and
    send the data to the second device with instructions to process the data and display a representation of the user's facial expressions on a display screen associated with the second device.

11. The media of claim 10, wherein one of the subtractive filters is a facial-landmark filter, wherein the facial-landmark filter removes substantially all data from the video except for a set of facial landmarks for the face, and wherein the facial-landmark filter is applied based on a determination that the level of network connectivity is below a threshold level.

12. The media of claim 10, wherein the representation of the user's facial expressions comprises one or more animated features that have been added to the data.

13. The media of claim 10, wherein one of the subtractive filters is a dominant-feature filter, wherein the dominant-feature filter removes substantially all video data from the original data stream except for one or more dominant features of each of the isolated faces, and wherein the dominant-feature filter is applied based on a determination that the level of network connectivity is moderately poor.

14. The media of claim 13, wherein the dominant features comprise eyes and a mouth of the first user.

15. The media of claim 10, wherein the representation of the user's facial expressions comprises one or more animated features that have been added to the data, and wherein the animated features are generated at least in part based on a machine-learning model that takes as input the data received from the first device and audio data and outputs the representation of the user's facial expressions.

16. A system comprising:
    one or more processors; and
    one or more computer-readable non-transitory storage media coupled to one or more of the processors and comprising instructions operable when executed by one or more of the processors to cause the system to:
       receive a request to establish a live audiovisual streaming session between a first device and a second device;
       determine a level of network connectivity for a network associated with the first device or the second device;
       receive data generated by the first device, wherein the data represents facial expressions of a user in a video captured by the first device, wherein the data is generated by the first device using the video based on:
          a detection of a face or a facial feature of the user in the video; and
          an application of one or more subtractive filters on the video using the detected face or facial feature, wherein the one or more subtractive filters are selected based on the level of network connectivity, wherein the data, relative to the video, is reduced in size based on the application of the one or more subtractive filters; and send the data to the second device with instructions to process the data and display a representation of the user's facial expressions on a display screen associated with the second device.

17. The system of claim 16, wherein one of the subtractive filters is a facial-landmark filter, wherein the facial-landmark filter removes substantially all data from the video except for a set of facial landmarks for the face, and wherein the facial-landmark filter is applied based on a determination that the level of network connectivity is below a threshold level.

18. The system of claim 16, wherein the representation of the user's facial expressions comprises one or more animated features that have been added to the data.

19. The system of claim 16, wherein one of the subtractive filters is a dominant-feature filter, wherein the dominant-feature filter removes substantially all video data from the original data stream except for one or more dominant features of each of the isolated faces, and wherein the dominant-feature filter is applied based on a determination that the level of network connectivity is moderately poor.

20. The system of claim 19, wherein the dominant features comprise eyes and a mouth of the first user.

* * * * *